United States Patent
Kwon et al.

(10) Patent No.: US 8,595,412 B2
(45) Date of Patent: Nov. 26, 2013

(54) DATA STORAGE DEVICE AND DATA STORAGE SYSTEM INCLUDING THE SAME

(75) Inventors: Min Cheol Kwon, Seoul (KR); Dong Jun Shin, Hwasung-si (KR); Seong Jun Ahn, Seoul (KR); Shin-Ho Choi, Suwon-si (KR); Shine Kim, Suwon-si (KR); Sun-Mi Yoo, Seoul (KR); Mi Kyeong Kang, Hwasung-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 773 days.

(21) Appl. No.: 12/754,753

(22) Filed: Apr. 6, 2010

(65) Prior Publication Data

US 2010/0268870 A1  Oct. 21, 2010

(30) Foreign Application Priority Data

Apr. 15, 2009  (KR) .................. 10-2009-0032771

(51) Int. Cl.
*G06F 12/00* (2006.01)
(52) U.S. Cl.
USPC ........... 711/103; 711/170; 711/202; 711/206; 711/E12.008
(58) Field of Classification Search
USPC ................. 711/103, E12.002, 203, 202, 170, 711/E12.058, E12.008, 206
See application file for complete search history.

(56) References Cited

U.S. PATENT DOCUMENTS

| | | | |
|---|---|---|---|
| 7,383,375 B2 * | 6/2008 | Sinclair | 711/103 |
| 7,526,599 B2 * | 4/2009 | Chang et al. | 711/103 |
| 8,055,832 B2 * | 11/2011 | Sinclair et al. | 711/103 |
| 8,069,284 B2 * | 11/2011 | Oh | 710/52 |
| 8,095,723 B2 * | 1/2012 | Kim et al. | 711/103 |
| 8,261,010 B2 * | 9/2012 | Eom et al. | 711/103 |
| 2006/0179263 A1 | 8/2006 | Song et al. | |
| 2008/0189490 A1 | 8/2008 | Cheon et al. | |
| 2009/0222618 A1 * | 9/2009 | Cho | 711/103 |
| 2010/0095060 A1 * | 4/2010 | Strange et al. | 711/114 |
| 2010/0095084 A1 * | 4/2010 | Manning | 711/206 |

FOREIGN PATENT DOCUMENTS

| | | |
|---|---|---|
| JP | 2006-216036 | 8/2006 |
| JP | 2008-192154 | 8/2008 |
| KR | 1020060089491 A | 8/2006 |
| KR | 1020080033649 A | 4/2008 |
| KR | 1020080073499 A | 8/2008 |

* cited by examiner

*Primary Examiner* — Pierre-Michel Bataille
(74) *Attorney, Agent, or Firm* — Volentine & Whitt, PLLC

(57) ABSTRACT

A data storage device includes a flash memory including a plurality of data blocks and a flash translation layer that divides the plurality of data blocks into a data block of a first group and a data block of a second group, and that records the data signal to a data block of the first group or a data block of the second group which is extended from a data block of the first group.

12 Claims, 4 Drawing Sheets

DATA STORAGE DEVICE AND DATA STORAGE SYSTEM INCLUDING THE SAME

CROSS-REFERENCE TO RELATED APPLICATIONS

A claim of priority under 35 U.S.C. §119 is made to Korean Patent Application No. 10-2009-0032771, filed on Apr. 15, 2009, the entirety of which is incorporated herein by reference.

BACKGROUND

Embodiments of the present inventive concept relate to a data storage device and a data storage system including the same, and more particularly to a data storage device capable of reducing the number of merge operations and a data storage system including the same.

In a data storage device using a flash memory, a flash translation layer (FTL) is used to manage a flash memory efficiently. The FTL may perform an address mapping operation converting a logical address LA, which is input from outside, e.g., from a file system like a host, to a physical address (PA). Data, which is input with the logical address, may then be stored in a flash memory according to a result of the address mapping operation.

As representative methods of the address mapping operation of the FTL, there are a page mapping method, a block mapping method and a hybrid mapping method. The hybrid mapping method is for countering weak points of the page mapping method and the block mapping method.

Generally, a flash memory may include a plurality of memory blocks, and the plurality of memory blocks may include a plurality of pages, respectively. The hybrid mapping method of the FTL uses the block mapping method for a data block and uses the page mapping method for a log block. Here, an initial data input from outside may be stored in the data block and an update data of the initial data stored in the data block may be stored in the log block. However, in the above-mentioned hybrid mapping method, owing to the frequency or number of occurrences of a merge operation, which merge operation is performed when the log block of the flash memory is exhausted, a performance deterioration phenomenon of the flash memory occurs and efficiency among a plurality of memory blocks of the flash memory declines, accordingly.

SUMMARY

The inventive concept generally provides a data storage device capable of reducing the number of merge operations, and a data storage system including the data storage device.

An example embodiment of the inventive concept is directed to a data storage device, including a flash memory including a plurality of data blocks and a flash translation layer dividing the plurality of data blocks into a data block of a first group and a data block of a second group and, according to a determination result of a data signal input from outside, recording the data signal in a data block of the first group or a data block of the second group, which is extended from a data block of the first group.

Another example embodiment of the inventive concept is directed to a data storage system including a host outputting a data signal and a logical address, and a data storage device recording a data signal supplied from the host at a designated location.

BRIEF DESCRIPTION OF THE DRAWINGS

These and/or other aspects and advantages of the present general inventive concept will become apparent and more readily appreciated from the following description of the embodiments, taken in conjunction with the accompanying drawings, which are incorporated in and constitute a part of this specification, and wherein.

DETAILED DESCRIPTION OF THE PREFERRED EMBODIMENTS

Figure 1:
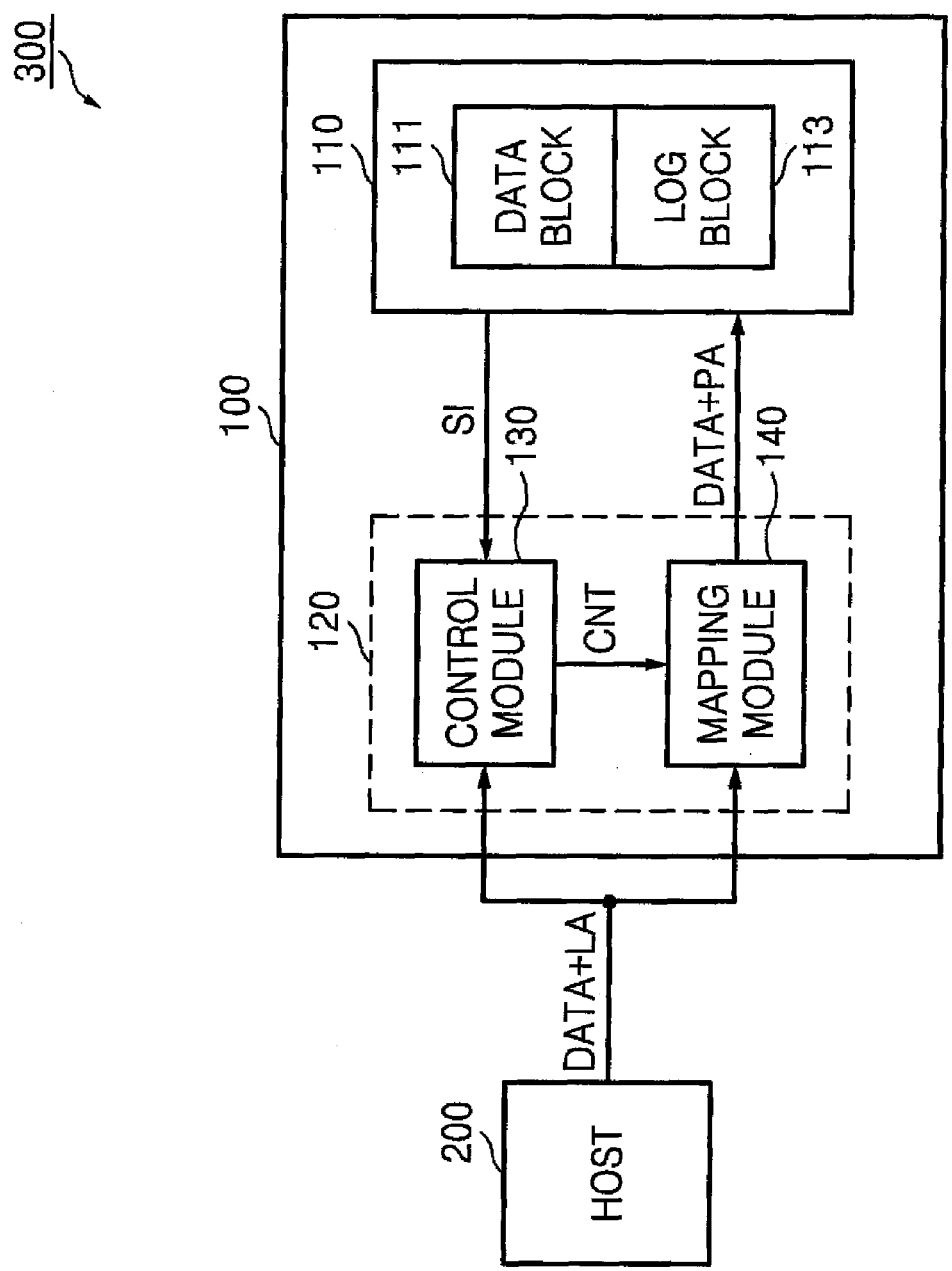
FIG. 1 is a schematic block diagram of a data storage system according to an example embodiment of the inventive concept.

Reference will now be made in detail to the embodiments of the present general inventive concept, examples of which are illustrated in the accompanying drawings, wherein like reference numerals refer to the like elements throughout. The embodiments are described below in order to generally explain the inventive concept by referring to the figures.

A data storage device of the inventive concept may be used for data storage in various fields such as a computer system, a terminal device system, an input/output device system, a hard disk recorder (HDD recorder), a personal terminal such as a cellular phone and a PDA, a computer (PC, a laptop computer, a desktop computer, etc.), a navigator device, a home automation system, a music player (mp3 player, etc.), a camcorder, an image player, a storage server, a portable multimedia player (PMP), a solid state drive/disk (SSD) or a card system including a smart card. The following takes and explains an example that the data storage device is used in a SSD among the above-mentioned various fields for an ease of explanation. Accordingly, a data storage system of the inventive concept is explained with reference to a computer system or a memory card system using the SSD as an example, but should not however be limited to use with a memory card system using the SSD.

Figure 2:
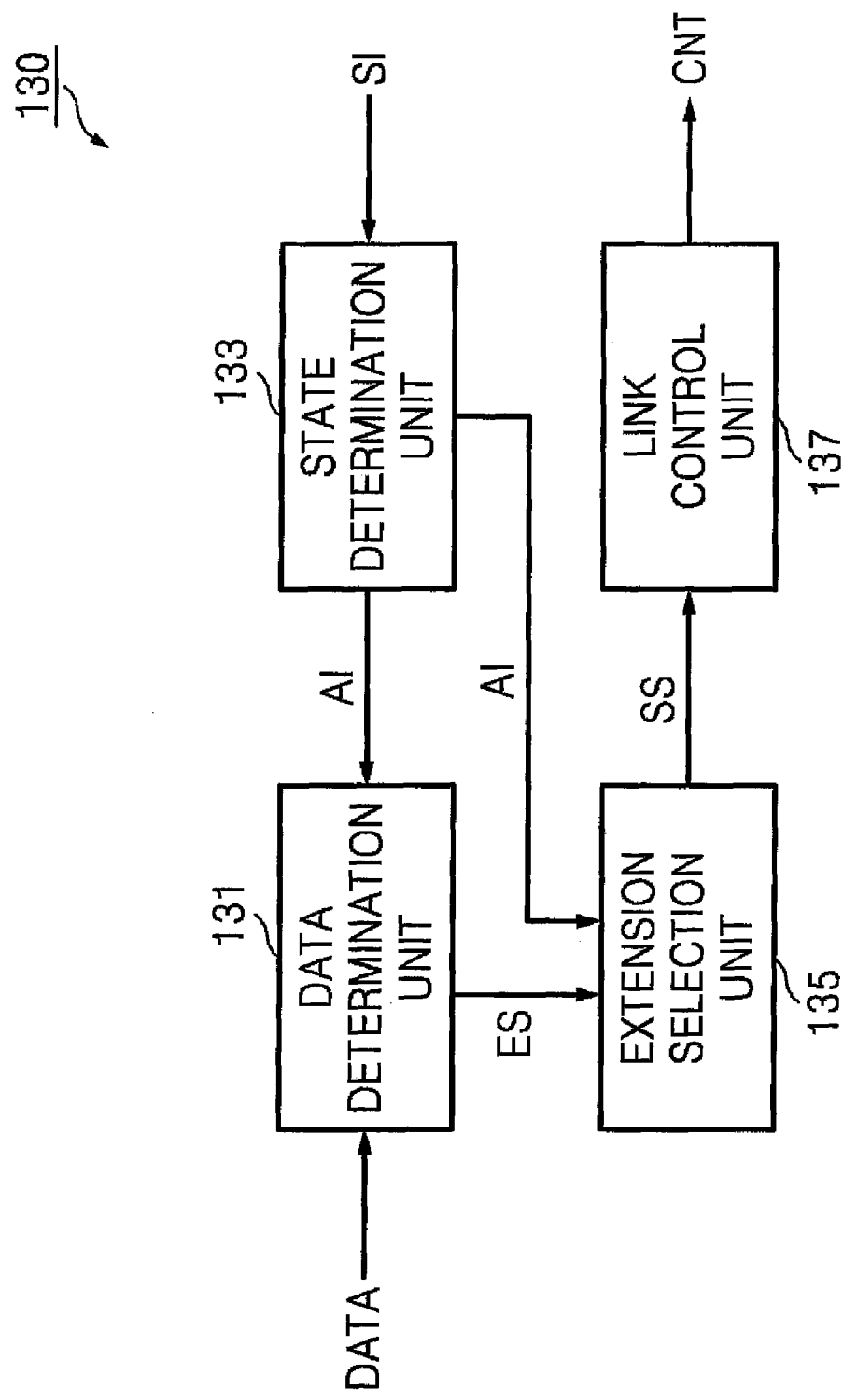
FIG. 2 is a schematic block diagram of a control module illustrated in FIG. 1.
Figure 3:
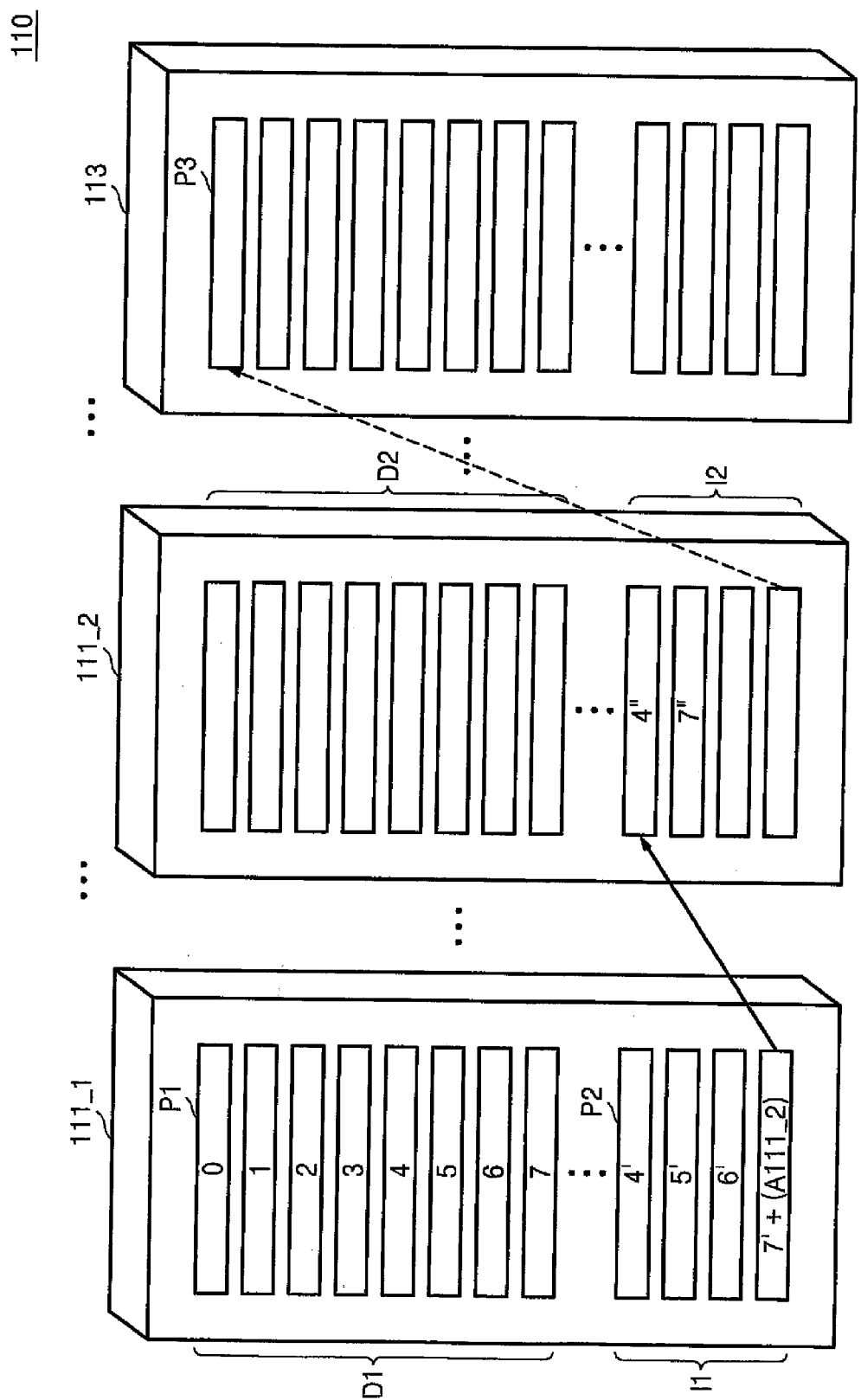
FIG. 3 are schematic diagrams of a flash memory illustrated in FIG. 1.

FIG. 1 is a schematic block diagram of a data storage system according to an example embodiment of the inventive concept, FIG. 2 is a schematic block diagram of a control module illustrated in FIG. 1, and FIG. 3 are schematic diagrams of a flash memory illustrated in FIG. 1.

Referring to FIGS. 1 to 3, the data storage system 300 may include a host 200 and a data storage device 100. The host 200 may be a file system, and may supply a data signal DATA to be programmed or written to the data storage device 100, or may be provided with read data from the data storage device 100.

The host 200 may output data signals DATA and logical addresses together, the logical addresses indicating locations or addresses where data corresponding to the data signals (e.g., the data signal DATA) are to be programmed to the data storage device 100.

The data storage device 100 may include at least a flash memory 110 and a flash translation layer FTL 120 capable of controlling an operation of the flash memory 110. The data storage device 100 may write or program and store data signals supplied from the host 200 at designated locations of the flash memory 110, e.g., locations based on logical addresses LA input with the data signal DATA.

For example, a mapping module 140 of the FTL 120 may map and convert the logical addresses LA supplied from the host 200 to physical addresses (PA) indicating substantial locations of the flash memory 110, and may write the data signals DATA to the corresponding physical addresses PA of the flash memory according to a conversion result.

The flash memory 110 may include at least one data block 111 and at least one log block 113. The data block 111 and the log block 113 may include a plurality of pages, respectively.

Referring to FIGS. 1 and 3, the flash memory 110 may include a first data block 111_1, a second data block 111_2, and a log block 113. The first data block 111_1, the second data block 111_2, and the log block 113 may include a plurality of pages P1, P2, and P3, respectively. In addition, the first data block 111_1 and the second data block 111_2 may be divided into a data region D1 and D2 and an In Block Logging (IBL) region I1 and I2, and the data region D1 and D2 and the IBL region I1 and I2 may include a plurality of pages P1, P2 and P3, respectively.

In the data region D1 of the first data block 111_1 and the data region D2 of the second data block 111_2, an original data signal supplied from the host may be stored. In the IBL region I1 of the first data block 111_1 and the IBL region I2 of the second data block 111_2, an update data signal supplied from the host 200 may be stored. The update data signal supplied from the host 200 may be stored in each of a plurality of pages P3 of the log block 113. The FTL 120 may include a control module 130 and a mapping module 140.

The control module 130 may output a control signal CNT based on a data signal DATA supplied from the host 200. The control signal CNT may control an address mapping operation or a write operation of the mapping module 140. For example, the control signal CNT output from the control module 130 may be supplied to the mapping module 140. The control signal CNT may control the data signal DATA to be written in a data block having a converted physical address PA corresponding to a logical address LA or in an extended data block when the data signal DATA is written in the flash memory 110 by the mapping module 140.

The control module 130 as shown in FIG. 2 may include a data determination unit 131, a state determination unit 133, an extension selection unit 135 and a link control unit 137.

The data determination unit 131 may judge the data signal DATA supplied from the host 200 and determine a storage location of the data signal DATA according to a judgment result. For example, the data determination unit 131 may judge if the data signal DATA supplied from the host 200 is an original data signal or an update data signal. Additionally, according to a judgment result, the data determination unit 131 may determine a write location of the data signal DATA based on a logical address LA supplied with the data signal DATA.

Here, an original data signal is a first data recorded in a logical address LA in a data block of the flash memory 110, and an update data signal may mean a data for a logical address LA whereby there is already a data recorded in advance about the same logical address LA in the data block in the flash memory 110.

For example, the data determination unit 131, when an input data signal DATA is an original data signal, may select a corresponding data block 111_1 or 111_2 based on a logical address LA input with the data signal DATA and determine that the data signal DATA be stored in a data region D1 or D2 of a selected data block 111_1 or 111_2.

Moreover, the data determination unit 131, when an input data signal DATA is an update data signal, may select a corresponding data block 111_1 or 111_2 based on a logical address LA input with the data signal DATA and determine that the data signal DATA be stored in an IBL region I1 or I2 of the selected data block 111_1 or 111_2.

The data determination unit 131, when an input data signal DATA is an update data signal, may also determine the data signal DATA to be stored in an IBL region I2 of not an original data block, i.e., a data block corresponding to a logical address LA input with the data signal DATA, but an extended data block 111_2. For example, the data determination unit 131 may determine to extend a data block where the data signal DATA is stored based on an assortment information (AI) supplied from a state determination unit 133.

When the data signal DATA input to the data determination unit 131 is an update data signal and a data block should be extended based on the assortment information (AI), the data determination unit 131 may output an extension signal ES. The extension signal ES is input to an extension selection unit 135 and the extension selection unit 135 may select one of a plurality of data blocks 111_1 and 111_2 of the flash memory 110 as an extension data block according to the extension signal ES.

The state determination unit 133 may divide a plurality of data blocks 111_1 and 111_2 into a first group and a second group based on state information SI supplied from the flash memory 110, e.g., state information on a plurality of data blocks 111_1 and 111_2, and may output the assortment information AI. The state information SI supplied from the flash memory 110 may include remaining storage space information, e.g., remaining page information, which a plurality of data blocks 111_1 and 111_2 of the flash memory 110 have respectively.

The first group and the second group assorted (or classified) by the state determination unit 133 may include a plurality of data blocks, respectively. The first group and the second group may be assorted according to the number of accesses thereto from outside. For example, a plurality of data blocks of the first group may have greater access numbers compared to a plurality of data blocks of the second group.

The state determination unit 133 may output assortment information AI assorting a plurality of data blocks into the first group and the second group as described above. In the assortment information AI, each state information SI of a plurality of data blocks 111_1 and 111_2 included in each of the first group and the second group supplied from the flash memory 110, i.e., remaining storage space information, e.g., remaining page information, in each of a plurality of data blocks 111_1 and 111_2, may be included.

The extension selection unit 135, when an extension signal ES is output from the data determination unit 131, may select one of a plurality of data blocks 111_1 and 111_2 of the flash memory 110 as the extension data block based on the extension signal ES.

For example, the data determination unit 131 and the extension selection unit 135 may be provided with the assortment information AI from the state determination unit 133. When the data determination unit 131 outputs an extension signal ES to the extension selection unit 135 based on an input data signal DATA and the assortment information AI, the extension selection unit 135 may select one of a plurality of data blocks which is assorted into a first group and a second group as an extension data block based on the assortment information AI. Here, the extension selection unit 135 may select a data block 111_2 among a plurality of data blocks of the second group as an extension data block. The extension selection unit 135 may output a selection signal SS including an address A111_2 of a selected extension data block.

The link control unit 137 may output a control signal CNT capable of controlling an address mapping operation of a mapping module 140 based on the selection signal SS output from the extension selection unit 135. For example, the link control unit 137, when the mapping module 140 writes a data signal DATA in a data block having (or indicating) a physical address PA corresponding to a logical address LA, may output a control signal CNT for controlling the mapping module 140 to write the address A111_2 of the extension data block together with the data signal DATA according to the selection signal SS output from the extension selection unit 135.

That is, the mapping module 140 may write the address A111_2 of the extension data block selected by the extension selection unit 135 along with a data signal DATA input from the host 200 based on a control signal CNT output from the link control unit 137.

The mapping module 140 may map a logical address LA output from the host 200 to a physical address PA based on a control signal CNT output from the link control unit 137, and write a data signal DATA in a data block of the flash memory 110, which is designated by the physical address PA, based on a mapping result.

The mapping module 140 may include an address mapping unit (not shown) mapping a logical address LA output from the host 200 to a physical address PA. The address mapping unit may map the logical address LA to the physical address PA by using various address mapping methods. For example, the address mapping unit may perform an address mapping operation by using one of a page mapping method, a block mapping method and a hybrid mapping method.

The page mapping method is a way of performing an address mapping operation by the page. The block mapping method is a way of performing an address mapping operation by the block. The hybrid mapping method is a way of performing an address mapping operation by mixing the page mapping method and the block mapping method.

The hybrid mapping method may perform an address mapping operation by using the block mapping method when a data signal DATA supplied from the host 200 is an original data signal, and it may perform an address mapping operation by using the page mapping method when the data DATA supplied from the host 200 is an update data signal. The present embodiment takes and explains an example that the mapping module 140 uses the hybrid mapping method.

When a logical address/logical addresses LA is converted to a physical address/physical addresses PA by the address mapping unit, the mapping module 140 may write data signal(s) DATA in a data block of the flash memory 110 based on a converted physical address/converted physical addresses PA.

Figure 4:
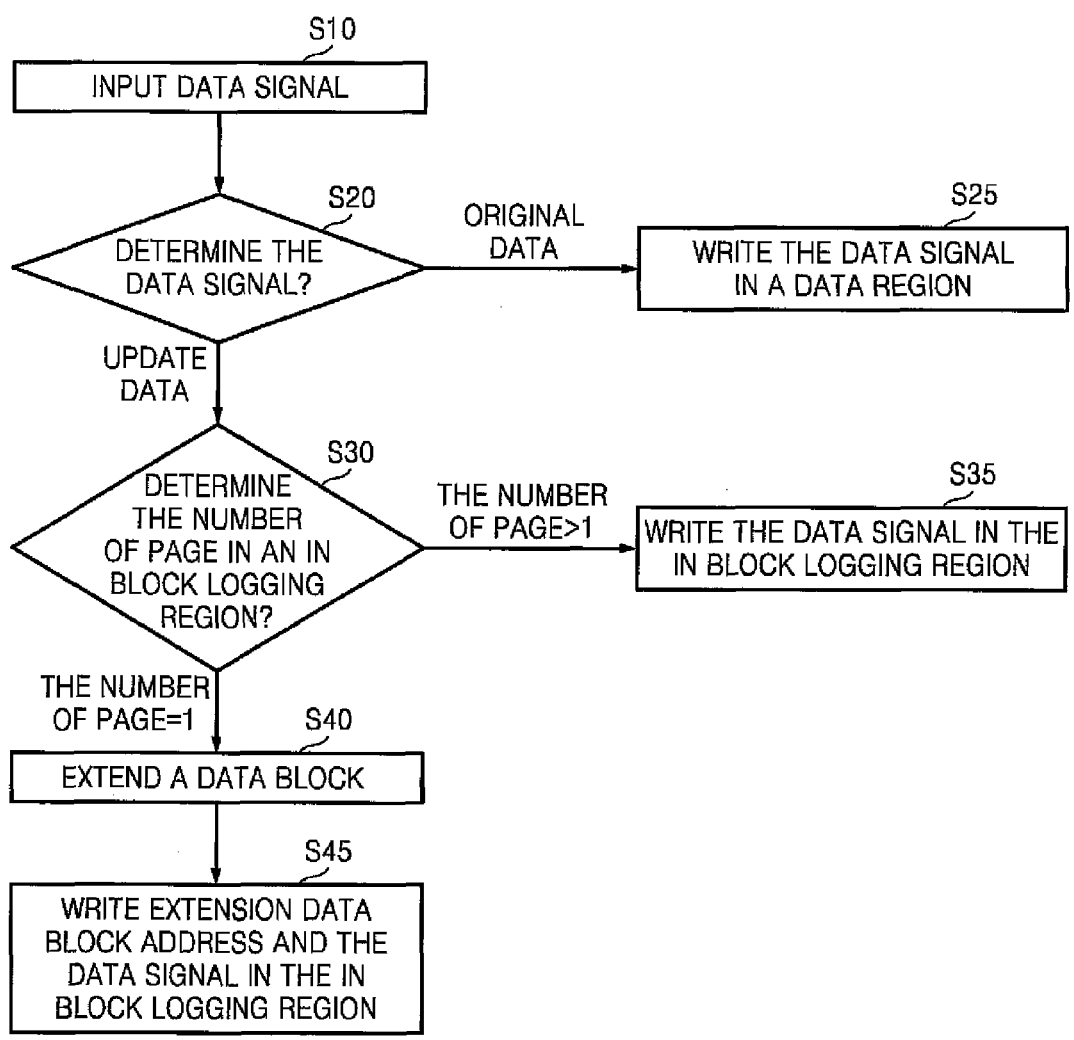
FIG. 4 is an operational flowchart of the data storage system illustrated in FIG. 1.

The following explains an above-mentioned write operation of a data storage system in detail. FIG. 4 is an operational flowchart of a data storage system illustrated in FIG. 1. Referring to FIGS. 1 to 4, the host 200 may output a data signal DATA and a corresponding logical address LA to a data storage device 100 (S10).

The FTL 120 of the data storage device 100 may determine an input data signal DATA (S20). For example, the data signal DATA may be input to a control module 130 of the FTL 120. The data determination unit 131 of the control module 130 may determine whether the input signal DATA is an original data signal or an update data signal.

According to a determination result of the data determination unit 131 (S20), when the input data signal DATA is an original data signal, the data determination unit 131 may determine the data signal DATA to be stored in a data region of a data block of the flash memory 110 (S25).

The mapping module 140 may write a data signal DATA to a data region of a data block based on a converted physical address PA, i.e., a physical address PA that a logical address LA input with the data signal DATA is converted to through an address mapping.

Here, the flash memory 110 may include a first group and a second group assorted (or classified) by the state determination unit 133 of the FTL 120, and the mapping module 140 may write a data signal DATA to a data region D1 of a data block 111_1 included in the first group of the flash memory 110.

Referring to FIG. 3, when a data signal DATA input from the host 200 is 4 and an original data signal according to a determination result of the data determination unit 131 (S20), the data signal DATA may be written in one of a plurality of pages included in a data region D1 of a data block 111_1 in the first group of the flash memory 110 by the mapping module 140 (S25).

On the other hand, according to a determination result of the data determination unit 131, when an input data signal DATA is an update data signal, the data determination unit 131 may determine a current state of a data block where the data signal DATA is written, i.e., the number of remaining pages, referring to the assortment information AI supplied from the state determination unit 133 (S30). For example, the data determination unit 131 may determine the number of remaining pages in an IBL region of a data block where a data signal DATA is to be written referring to the assortment information AI supplied from the state determination unit 133. Here, the data determination unit 131 may determine the number of remaining pages with a method of checking a page offset of a data block.

According to a result of determining by the data determination unit 131 (S30), when the number of remaining pages is larger than 1 (for example, when the number of remaining pages is a natural number larger than 1), the data determination unit 131 may determine that a data signal DATA should be stored in an IBL region of a data block (S35).

The mapping module 140 may write a data signal DATA in an IBL region of a data block based on a converted physical address PA, i.e., a physical address PA which a logical address LA input with a data signal DATA is converted to through address mapping.

Here, the mapping module 140 may write a data signal DATA in an IBL region I1 of a data block 111_1 included in a first group of the flash memory 110.

Referring to FIG. 3, when a data signal DATA input from the host 200 is 4' and an update signal according to a determination result of the data determination unit 131 (S20), and the number of remaining pages in an IBL region I1 of a data block 111_1 of a first group of the flash memory 110 where a data signal DATA is to be written is larger than 1 (S30), the data signal DATA may be written in one of a plurality of pages included in the IBL region I1 by the mapping module 140 (S35).

However, when according to a result of determining by the data determination unit 131 the number of remaining pages in the IBL region of the data block referring to the assortment information AI supplied from the state determination unit 133 is 1 (S30), the data determination unit 131 may output an extension signal ES for selecting one of a plurality of data blocks as an extension data block.

The extension signal ES output from the data determination unit 131 may be supplied to an extension selection unit 135, and the extension selection unit 135 may select one of a plurality of data blocks assorted by the state determination unit 133 as an extension data block based on the extension signal ES (S40). For example, the extension selection unit 135 may select one of data blocks of a first group and a second group, which are assorted by the state determination unit 133, as the extension data block when the extension signal ES is output from the data determination unit 131. Here, the extension selection unit 135 may output a selection signal SS including an address of a selected extension data block to a link control unit 137.

Referring to FIG. 3, when a data signal DATA input from the host 200 is 7' and an update data signal according to a determination result of the data determination unit 131 (S20), and the number of remaining pages in the IBL region I1 of the data block 111_1 of the first group of the flash memory 110 where the data signal DATA is to be written is 1 (S30), the data determination unit 131 may output an extension signal ES.

The extension selection unit 135 may select a data block 111_2 of a second group among a data block 111_1 of a first group and a data block 111_2 of a second group as an extension data block according to an extension signal ES. The extension selection unit 135 may output a selective signal SS selecting the data block 111_2 of the second group as an extension data block, and the selection signal SS may include an address A111_2 of the extension data block, i.e., the data block 111_2 of the second group. When the extension data block is selected by the extension selection unit 135, the link control unit 137 may output a control signal CNT based on the selection signal SS. The control signal CNT may include an address A111_2 of an extended data block, i.e., the data block 111_2 of the second group.

The mapping module 140 may write a data signal DATA and an address A111_2 of an extended data block in an IBL region I1 of a data block having a converted physical address PA, e.g., the data block 111_1 of the first group, based on the control signal CNT. The mapping module 140 may write both the data signal DATA and the address of the extended data block in an IBL region of a data block of the flash memory 110 corresponding to the converted physical address PA based on the control signal CNT (S45).

For example, the extension selection unit 135 may output a selection signal SS including the address A111_2 of a selected extension data block, i.e., the data block 111_2 of the second group, to the link control unit 137, and the link control unit 137 may output a control signal CNT to the mapping module 140 based on a selection signal SS.

The mapping module 140 may write a data signal DATA and an address A111_2 of an extended data block, which is included in a control signal CNT supplied from the link control unit 137, in the IBL region I1 of a data block, i.e., the data block 111_1 of the first group, corresponding to the converted physical address PA.

Referring to FIG. 3, the link control unit 137 may output the control signal CNT including an address A111_2 of a data block 111_2 of an extended second group to the mapping module 140. The mapping module 140 may write a data signal DATA of 7' and the address A111_2 of the data block 111_2 of the extended second group in an IBL region I1 of a data block corresponding to a converted physical address PA, i.e., a data block 111_1 of a first group, based on the control signal CNT.

On the other hand, when a new data signal DATA of 4" is input from the host 200 and is an update data signal according to a determination result of the data determination unit 131 (S20), the data determination unit 131 may refer to the address A111_2 of the data block 111_2 of a second group written with a data signal DATA of 7', which is input from the host 200 in advance, in the IBL region I1 of the data block 111_1 of the first group. According to a reference result, the data determination unit 131 may determine that the new data signal DATA of 4" be stored in an IBL region I2 of an extended data block, i.e., a data block 111_2 of a second group. Accordingly, the mapping module 140 may write the new data signal DATA of 4" in the IBL region I2 of the data block 111_2 of the second group.

As described above, in a data storage system 300 according to example embodiments of the inventive concept, a data block of a flash memory 110 having a lower access number, e.g., a data block 111_2 assorted to a second group, is used as an extension data block. Accordingly, the data storage device 100 may store an update data signal output from the host 200 in an extension data block in data blocks 111-1 and 111-2. Since the update data signal is thus not stored in the log block 113 but in the extension data block, the number of a merge operations is reduced.

Meanwhile, a data signal DATA is continuously input from the host 200 to update data stored in a data block 111_1 of a first group, and accordingly when the number of pages remaining in an IBL region of an extension data block is 1, the extension selection unit 135 may select an extension data block once again.

For example, referring to FIG. 3, when the number of pages remaining in an IBL region I2 of a data block 111_2 of a second group, which is extended by a data signal DATA input from the host 200, is 1, the data determination unit 131 may output an extension signal ES once again and the extension selection unit 135 may select an extension data block once again based on the extension signal ES. Here, the extension selection unit 135 may select the log block 113 of the flash memory as the extension data block. According to these example embodiments, the extension selection unit 135 may select one of data blocks of a second group, except for the extended data block 111_2 of the second group as an extension data block.

A data storage device of the inventive concept and a data storage system including the same may reduce the number of a merge operation by extending a data block of a flash memory, and consequently may improve performance of the data storage device by raising efficiency between blocks.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A data storage device comprising:
a flash memory including a plurality of data blocks; and
a flash translation layer dividing the plurality of data blocks into data blocks of a first group and data blocks of a second group, and recording a data signal in a data block of the first group or in a data block of the second group which is extended from a data block of the first group, according to a determination result of the data signal input from outside,
wherein the flash translation layer comprises:
a data determination unit judging the data signal and determining a record location of the data signal;
a state determination unit dividing the plurality of data blocks into the data blocks of the first group and the data blocks of the second group;
an extension selection unit selecting a data block of the second group as an extension data block based on an assortment result of the state determination unit; and
a link control unit outputting a control signal including an address of the selected extension data block.

2. The data storage device of claim 1, wherein the flash translation layer further comprises a mapping module for recording the data signal in one of the plurality of data blocks, wherein the mapping module records the data signal and the address of the selected extension data block in the one of the plurality data blocks based on the control signal output from the link control unit.

3. The data storage device of claim 2, wherein the flash translation layer receives the data signal and a logical address from the outside, wherein the mapping module maps the logical address and writes the data signal and the address of the selected extension data block in the one of the plurality data blocks based on a mapping result.

4. The data storage device of claim 1, wherein each of the plurality of data blocks comprises a data region and an in block logging (IBL) region, wherein the data determination unit determines that the data signal be recorded in a data region when the data signal is an original data signal and determines that the data signal be recorded in an IBL region when the data signal is an update data signal.

5. The data storage device of claim 1, wherein each of the plurality of data blocks comprises a data region and an in block logging (IBL) region,
 wherein each of the data regions and the IBL regions comprise a plurality of pages,
 wherein the data determination unit outputs an extension signal to extend the data block where the data signal is to be recorded when the data signal is an update signal and a number of pages remaining in an IBL region of the data block is 1, and
 wherein the extension selection unit selects the data block of the second group as the extension data block based on the extension signal output from the data determination unit and an assortment result of the state determination unit.

6. A data storage system comprising:
 a host outputting a data signal and a logical address; and
 a data storage device recording the data signal supplied from the host to a designated location, the data storage device including
  a flash memory including a plurality of data blocks, and
  a flash translation layer assorting the plurality of data blocks into data blocks of a first group and data blocks of a second group, and recording the data signal in a data block of the first group or a data block of the second group which is extended from a data block of the first group, according to a determination result of the data signal,
 wherein the flash translation layer comprises:
 a data determination unit judging the data signal and determining a record location of the data signal;
 a state determination unit dividing the plurality of data blocks into the data blocks of the first group and the data blocks of the second group;
 an extension selection unit selecting a data block of the second group as an extension data block based on an assortment result of the state determination unit; and
 a link control unit outputting a control signal including an address of the selected extension data block.

7. The data storage system of claim 6, wherein the flash translation layer further comprises a mapping module for recording the data signal in one of the plurality of data blocks, wherein the mapping module records the data signal and the address of the selected extension data block in the one of the plurality of data blocks based on the control signal output from the link control unit.

8. The data storage system of claim 7, wherein the flash translation layer receives the data signal and a logical address from the host, wherein the mapping module maps the logical address, and writes the data signal and the address of the selected extension data block in the one of the plurality of data blocks based on a mapping result.

9. The data storage system of claim 6, wherein each of the plurality of data blocks comprises a data region and an in block logging (IBL) region, wherein the data determination unit determines that the data signal be recorded in a data region when the data signal is an original data signal and determines that the data signal be recorded in an IBL region when the data signal is an update data signal.

10. The data storage system of claim 6, wherein each of the plurality of data blocks comprises a data region and an in block logging (IBL) region,
 wherein each of the data regions and the IBL regions comprise a plurality of pages,
 wherein the data determination unit outputs an extension signal to extend the data block where the data signal is to be recorded when the data signal is an update signal and a number of pages remaining in an IBL region of the data block is 1, and
 wherein the extension selection unit selects the data block of the second group as the extension data block based on the extension signal output from the data determination unit and an assortment result of the state determination unit.

11. A data storage device comprising:
 a flash memory including a plurality of data blocks and a log block, the data blocks including in-block logging regions; and
 a flash translation layer that controls operation of the flash memory, the flash translation layer
  determines whether an input data signal to the data storage device is an original data signal or an update data signal,
  stores the input data signal in a data region of the data blocks upon determination that the input data signal is an original data signal,
  determines a number of available pages in the block logging regions upon determination that the input signal is an update data signal, and
  stores the update data signal in the in-block logging regions upon determination that the number of available pages is greater than 1,
 wherein upon determination that the number of available pages in an in-block logging region of a first of the data blocks is 1, the flash translation layer stores the update data signal in the available page of the in-block logging region of the first data block and in an in-block logging region of another of the data blocks.

12. The data storage device of claim 11,
 wherein the another data block is an extension data block, and the flash translation layer also stores an address of the extension data block in the first data block.

\* \* \* \* \*